US007099049B2

(12) United States Patent
Yu et al.

(10) Patent No.: US 7,099,049 B2
(45) Date of Patent: Aug. 29, 2006

(54) STOCHASTIC SCREENING METHOD WITH DOT PATTERN REGULARITY CONTROL AND DOT GROWTH

(75) Inventors: Shenbo Yu, Lowell, MA (US); Richard G. Comeau, Bedford, MA (US); Craig C. Cook, Wayland, MA (US); Fred W. Andree, Brookline, MA (US)

(73) Assignee: Zoran Corporation, Sunnyvale, CA (US)

( * ) Notice: Subject to any disclaimer, the term of this patent is extended or adjusted under 35 U.S.C. 154(b) by 104 days.

(21) Appl. No.: 10/218,018

(22) Filed: Aug. 13, 2002

(65) Prior Publication Data

US 2003/0035146 A1 Feb. 20, 2003

Related U.S. Application Data

(63) Continuation of application No. 09/211,698, filed on Dec. 14, 1998, now Pat. No. 6,433,891.

(51) Int. Cl.
*H04N 1/40* (2006.01)
(52) U.S. Cl. ..................... 358/3.26; 382/237
(58) Field of Classification Search ............. 358/1.9, 358/298, 534–536, 3.06–3.12, 3.26; 382/237
See application file for complete search history.

(56) References Cited

U.S. PATENT DOCUMENTS

| | | | |
|---|---|---|---|
| 5,111,310 A | 5/1992 | Parker et al. ............... 358/456 |
| 5,317,418 A | 5/1994 | Lin ............................. 358/456 |
| 5,463,720 A | 10/1995 | Granger ...................... 395/109 |
| 5,526,438 A | 6/1996 | Barton ........................ 382/237 |
| 5,535,020 A | 7/1996 | Ulichney ..................... 358/457 |
| 5,557,709 A | 9/1996 | Shu ............................. 395/109 |
| 5,673,121 A | 9/1997 | Wang .......................... 358/456 |
| 5,696,602 A | 12/1997 | Cooper et al. .............. 358/457 |
| 5,740,279 A | 4/1998 | Wang et al. ................ 382/237 |
| 5,745,660 A | 4/1998 | Kolpatzik et al. .......... 395/108 |
| 5,818,604 A | 10/1998 | Delabastita et al. ........ 358/298 |

FOREIGN PATENT DOCUMENTS

EP 580151 A2 1/1994

OTHER PUBLICATIONS

T.N. Pappas & D.L. Neuhoff, "Model-based Halftoning," Proc. SPIE, vol. 1453, Human Vision, Visual Proc., and Digital Display II, (1991), pp. 244-255.
T.N. Pappas & D.L. Neuhoff, "Least-squares Model-based Halftoning," Proc. SPIE, vol. 1666, Human Vision, Visual Proc., and Digital Display III, 1992, pp. 165-176.
M. Analoui and J.P. Allebach, "Model-based Halftoning Using Direct Binary Search," Proc. SPIE, vol. 1666, Human Vision, Visual Proc., and Digital Display III, 1992, pp. 96-108.
M. Yao and K.J. Parker, "Modified Approach to the Construction of a Blue Noise Mask", Journal of Electronic Imaging, vol. 3(1), Jan. 1994, pp. 92-97.

(Continued)

*Primary Examiner*—Thomas D. Lee
*Assistant Examiner*—Stephen Brinich
(74) *Attorney, Agent, or Firm*—Lahive & Cockfield, LLP

(57) ABSTRACT

A stochastic screening mask is provided for rendering halftone images. A filter controlled force masking method is used to vary the mask patterns from regularity to randomness. Dot size (amplitude), dot number (frequency), and dot shape are modulated integrally at each gray level during the generation of the mask. The single pixel limit for blue noise masking is broken down by this approach. The halftone patterns generated with this method can have visually pleasing blue noise attribute. This new screening method would provide flexible solutions for different types of printing processes.

4 Claims, 15 Drawing Sheets

OTHER PUBLICATIONS

W. Purgathofer et al., "Improved Threshold Matrices for Ordered Dithering", Graphics Gems V, pp. 297-301, Academic Press, Inc. (1995).

Robert Ulichney, "Digital Halftoning", pp. 234-238, MIT Press (1987).

John C. Russ, "The Image Processing handbook", CRC Press Inc., (1992).

$$\begin{pmatrix}
(nx-1,ny-1) & (nx-1,ny) & (nx-1,1) & (nx-1,2) & (nx-1,3) & \ldots & (nx-1,ny-2) & (nx-1,ny-1) & (nx-1,ny) & (nx-1,1) & (nx-1,2) \\
(nx,ny-1) & (nx,ny) & (nx,1) & (nx,2) & (nx,3) & \ldots & (nx,ny-2) & (nx,ny-1) & (nx,ny) & (nx,1) & (nx,2) \\
(1,ny-1) & (1,ny) & (1,1) & (1,2) & (1,3) & \ldots & (1,ny-2) & (1,ny-1) & (1,ny) & (1,1) & (1,2) \\
(2,ny-1) & (2,ny) & (2,1) & (2,2) & (2,3) & \ldots & (2,ny-2) & (2,ny-1) & (2,ny) & (2,1) & (2,2) \\
(3,ny-1) & (3,ny) & (3,1) & (3,2) & (3,3) & \ldots & (3,ny-2) & (3,ny-1) & (3,ny) & (3,1) & (3,2)
\end{pmatrix}$$

→ 420                                                          → 415

$$\begin{pmatrix}
\ldots & (i-2,j-2) & (i-2,j-1) & (i-2,j) & (i-2,j+1) & (i-2,j+2) & \ldots \\
\ldots & (i-1,j-2) & (i-1,j-1) & (i-1,j) & (i-1,j+1) & (i-1,j+2) & \ldots \\
\ldots & (i,j-2) & (i,j-1) & (i,j) & (i,j+1) & (i,j+2) & \ldots \\
\ldots & (i+1,j-2) & (i+1,j-1) & (i+1,j) & (i+1,j+1) & (i+1,j+2) & \ldots \\
\ldots & (i+2,j-2) & (i+2,j-1) & (i+2,j) & (i+2,j+1) & (i+2,j+2) & \ldots
\end{pmatrix}$$

→ 400

$$\begin{pmatrix}
(nx-2,ny-1) & (nx-2,ny) & (nx-2,1) & (nx-2,2) & (nx-2,3) & \ldots & (nx-2,ny-2) & (nx-2,ny-1) & (nx-2,ny) & (nx-2,1) & (nx-2,2) \\
(nx-1,ny-1) & (nx-1,ny) & (nx-1,1) & (nx-1,2) & (nx-1,3) & \ldots & (nx-1,ny-2) & (nx-1,ny-1) & (nx-1,ny) & (nx-1,1) & (nx-1,2) \\
(nx,ny-1) & (nx,ny) & (nx,1) & (nx,2) & (nx,3) & \ldots & (nx,ny-2) & (nx,ny-1) & (nx,ny) & (nx,1) & (nx,2) \\
(1,ny-1) & (1,ny) & (1,1) & (1,2) & (1,3) & \ldots & (1,ny-2) & (1,ny-1) & (1,ny) & (1,1) & (1,2) \\
(2,ny-1) & (2,ny) & (2,1) & (2,2) & (2,3) & \ldots & (2,ny-2) & (2,ny-1) & (2,ny) & (2,1) & (2,2)
\end{pmatrix}$$

→ 405                                                          → 410 nx = mask width
ny = mask height

FIG. 6

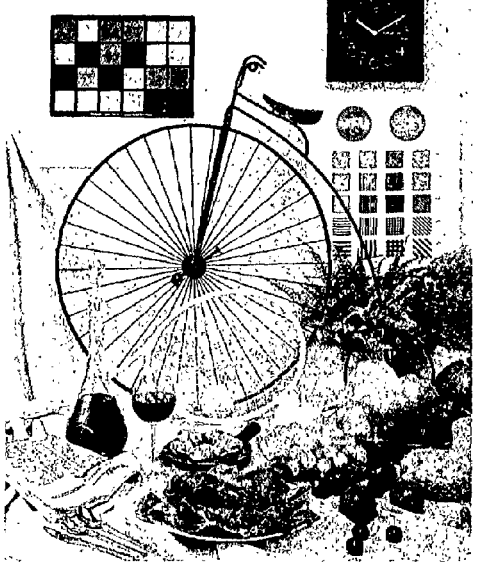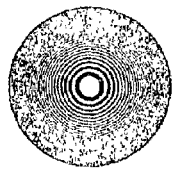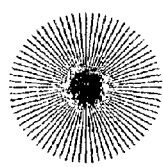
FIG. 12

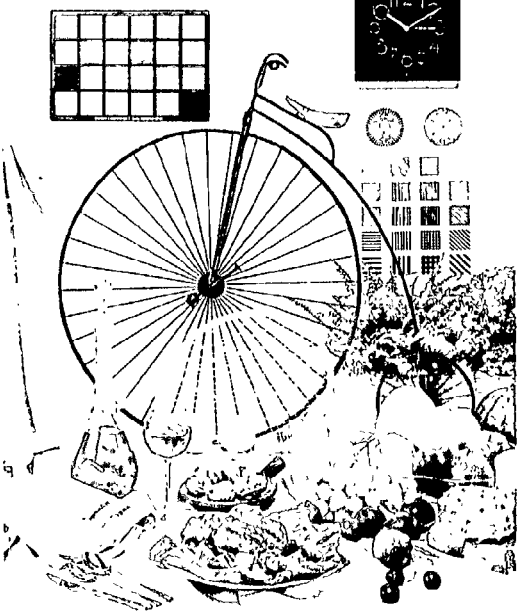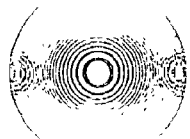
FIG. 13

STOCHASTIC SCREENING METHOD WITH DOT PATTERN REGULARITY CONTROL AND DOT GROWTH

This application is a continuation application of application Ser. No. 09/211,698 filed on Dec. 14, 1998, now U.S. Pat. No. 6,433,891, issuing Aug. 13, 2002. The contents of all of the aforementioned application is hereby incorporated by reference.

BACKGROUND AND FIELD OF THE INVENTION

The present invention relates generally to digital halftoning, and more particularly to a method of rendering a halftone image by utilizing a pixel-by-pixel comparison of an image against a stochastic dither matrix. The variation of dot patterns represented by the stochastic dither matrix is arranged by use of a filter-controlled force masking technique. The dot number and dot size are modulated to produce a uniform pattern and to break down the single pixel limit for blue noise masking.

Halftoning describes the process of displaying an image on a device that is capable of representing only a finite, discrete number of tone levels. Halftoning renders the illusion of various gray levels by using a binary pattern. Two examples in which halftoning is applied include the printing of an 8-bit image data on a 1-bit output device and the displaying of an 8-bit image data on a 4-bit monitor. Halftoning methods may be broken down into the present categories of neighborhood operations and point processing operations. Generally, neighborhood operations require considerably more computations than point processing operations. Examples of halftoning methods in the neighborhood operation category include: (1) the Model based error diffusion (MED) algorithm, as described in T. N. Pappas and D. L. Neuhoff, "Model-based Halftoning," *Proc. SPIE, vol. 1453, Human Vision, Visual Proc., and Digital Display III*, San Jose, Calif., Febuary 1992; (2) the least-square model-based (LSMB) algorithm, as described in T. N. Pappas and D. L. Neuhoff, "Least-squares Model-based Halftoning," *Proc. SPIE, vol. 1666, Human Vision, Visual Proc., and Digital Display III*, San Jose, Calif. Febuary 1992; and (3) Model-based halftoning using direct binary search, as described in M. Analoui and J. P. Allebach, "Model-based Halftoning Using Direct Binary Search," *Proc. SPIE, vol. 1666, Human Vision, Visual Proc., and Digital Display III*, San Jose, Calif. Febuary 1992.

Screening is a point processing operation. In screening, a two dimensional image (to be reproduced) is compared pixel-by-pixel with an image-independent threshold matrix. Screening methods may be classified into AM (amplitude modulated) screening, and FM (frequency modulated) screening. In AM screening, dot size (amplitude) is varied according to gray level. Dot size increases with gray level while the dot number is fixed. In contrast, a set of fixed-size, fine dots are used in FM screening whereby the dots are variably spaced from neighboring dots. When the gray level increases, the dot number (frequency) increases and therefore dot spacing is denser. Because the dot size of FM screening is smaller than the dot size of AM screening, an original image can be rendered with a higher resolution by FM screening.

Clustered dot screening is a traditional AM screening method. It is being widely used in hard copy printings because it is robust to dot overlap and other printer distortions. In the screen pattern, the higher threshold dots are centered so that dots are clustered around the center. In other words, the printed pattern consists of a plurality of central black dots that increase in size and form macro-dots as the gray value of the neighborhood decreases. When ink dots are printed in clusters, most of the black dots overlap with other black dots rather than overlap with white spaces. Thus changes in the apparent gray level due to dot overlap are minimized, and the accuracy of the gray-scale rendition of the printed image is maintained to some extent. However, the macro-dots in clustered-dot screening (i.e., low-frequency periodic artifacts) are highly visible and unpleasant in appearance to the human eye. This ordered screening leads to fine image and detail loss and to a moiré pattern when a prescreened image or color image is rendered.

In Bayer's dispersed-dot screening (which is a conventional FM screening method), the threshold matrix is designed to maximize the distance between printed dots in the printed image so that a number of dispersed micro-dots scattered throughout the pattern are produced. Since the conventional Bayer's threshold matrices are approximately based on regular orderings of the threshold values, visible patterns, such as textural contouring, often appear in the output images.

To overcome these drawbacks of ordered dispersed-dot screening, randomness is intentionally added to the dot pattern. In previous known approaches, there are two ways to obtain a visually favored pattern. One way is to optimize a random pattern by use of blue noise screening, as discussed in M. Yao and K. J. Parker, "Modified Approach to the Construction of a Blue Noise Mask," *Journal of Electronic Imaging*, vol. 3(1), January 1994, pp. 92–97; U.S. Pat. No. 5,111,310 to Parker; U.S. Pat. No. 5,535,020 to Ulichney; U.S. Pat. No. 5,317,418 to Lin; U.S. Pat. No. 5,463,720 to Granger; U.S. Pat. No. 5,557,709 to Shu; U.S. Pat. No. 5,673,121 to Wang; U.S. Pat. No. 5,557,602 to Cooper et al., and U.S. Pat. No. 5,745,660 to Kolpatzik et al. Starting from a random pattern, the above approaches use a dot profile, find voids and cluster "clumps", swap clumps and uniformly redistribute "ON" and "OFF" dots. Clumps are defined as unwanted low-frequency structures in blue noise mask construction.

The other way to obtain a visually favored pattern is to adjust a regular pattern to be random in some extent. In W. Purgathofer et al., "Improved Threshold Matrices for Ordered Dithering," *Graphics Gems V*, pp. 297–301, Academic Press, Inc. (1995), an approach is discussed whereby a repulsive force field generated by all "ON" dots is used to influence the resulting dot distribution.

The above-mentioned approaches for modifying ordered dispersed-dot screening avoid the contouring artifacts of Bayer's dithering, provide more detail and smooth image rendering, and eliminate moiré pattern in clustered-dot screening. However, in the above approaches, the image highlight areas can suffer from the visibility of individually printed dots. Therefore, images that are reproduced appear more grainy or noisy than those images produced in the light tone portion by clustered-dot screening.

Moreover, the above stochastic screening methods are only preferably selected when a display device can accommodate a single pixel. The reason is that when a single pixel can not be produced, it simply may be replicated to improve printability but resolution is sacrificed and the image appears more grainy.

In a laser printing (electrophotography) process, a photosensitive drum is charged with a scanning illumination, leaving a latent image to attract opposite-charged toner particles. The toner image is then offset to paper.

There are two additional problems for dot pattern reproduction when previous known stochastic screening methods are used in electrophotography. First, toners with the same charge repulse each other. Since the charge force is not uniform, some single dots or microdots aggregate. Again, the image looks more noisy. Second, dot misregistration results in more significant color shifts in a color image than in images reproduced by clustered-dot screening.

In U.S. Pat. No. 5,740,279 to Wang et al., it is indicated that conventional blue noise screening may work well in ink-jet printing but not in electrophotography. Thus, Wang discloses a composite lookup table (LUT) merged by a cluster screen and a stochastic screen. However, Wang does not guarantee the blue noise characteristic of a dot pattern at each gray level because the two processes are separated.

Therefore, there is a need for a stochastic screening method that is capable of producing a smooth and high detailed image that is free of a moiré pattern. There is also a need for a method for controlling the variation of patterns from a regular structure to a random structure so as to obtain a desirable mask. There is a further need for an approach that considers the physical behavior of a printer (e.g., dot overlap, dot reproduction, and dot registration) when generating a dithered mask.

SUMMARY OF THE INVENTION

In one aspect of the present invention, a dither matrix (mask) is generated for rendering a halftone image. The dither matrix forms a pattern upon completion. The method for forming the dither matrix includes the steps of modulating, at a each gray level, the dot number in the pattern for forming the dither matrix, and modulating, at each gray level, the dot size in the pattern for forming the dither matrix.

The present invention eliminates moiré patterns and also minimizes the grainy-image problem in previous known stochastic screening methods by controlling the variation of the pattern regularity of the mask. A filter-controlled force is used for generating the stochastic dither matrix. Modulation of dot size (amplitude) and dot number (frequency) is performed integrally at each gray level during generation of the mask. By integrating frequency modulation (FM) and amplitude modulation (AM) in the generation of the mask, it is possible to break down the limit of single pixel printability of previous known stochastic screening methods. This integration of AM and FM modulation is in contrast to conventional approaches which teach only dot number modulation for blue noise screening. A halftone image is then rendered by utilizing a pixel-by-pixel comparison of an image against the generated stochastic dither matrix. The invention permits a mid-size mask (such as a 128×128 mask) to be applied effectively in 1200 dpi laser printing.

DESCRIPTION OF THE DRAWINGS

FIG. 3 is a flowchart illustrating the details of determining the force field matrix after a pixel is turned on;

FIG. 6 is a matrix showing the force values of neighboring pixels of a particular "ON" pixel;

FIG. 12 shows various images (600 dpi) that are generated by use of the dither matrix in accordance with the present invention; and FIG. 13 shows various images (1200 dpi) that are generated by use of the dither matrix in accordance with the invention.

DETAILED DESCRIPTION OF THE DRAWINGS

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

A dither matrix (mask) is typically stored as an array in a programmable read only memory (PROM) in a computer or in a binary output display device. To generate a mask matrix, the pixels in the mask are turned on or off (i.e., dots are added on or moved out of the matrix). Mask generation is characterized by a probability setting rule for turning a given pixel on. In conventional blue noise screening methods, pixels are randomly turned on and then re-distributed according to different preferred rules. In Werner Purgathofer et al., "Improved Threshold Matrices for Ordered Dithering," *Graphic Gems V*, pp. 297–301 (1995), an approach is discussed whereby pixels are randomly turned on according to an equal distribution. Thus, one criteria for judging a stochastic dither mask is based upon how suitably randomness is added in the pattern provided by the mask.

The present invention provides a method of rendering a halftone image by utilizing a pixel-by-pixel comparison of an image against a stochastic dither matrix. The halftone rendering process includes printing dot patterns on a recording medium wherein the dot patterns are represented by the dither matrix. The present invention advantageously provides a stochastic dither matrix (mask) wherein randomness or regularity can be easily selected because the variation of a pattern in the dither matrix can be precisely controlled from a regular structure to a random structure. This feature is absent in conventional approaches. In particular, the present invention permits the variation of dot patterns from regular patterns to blue noise patterns. The method in accordance with the invention integrally modulates the dot number (frequency), dot size (amplitude) and dot shape at each gray level during the generation of the dither matrix. The halftone patterns that are generated therefore have a visually pleasing blue noise attribute. Thus, the invention will permit the production of a "crispy" image that is free from a moiré pattern. Furthermore, the screening method in accordance with the present invention provides flexible solutions to the different types of printing processes.

Figure 1A:
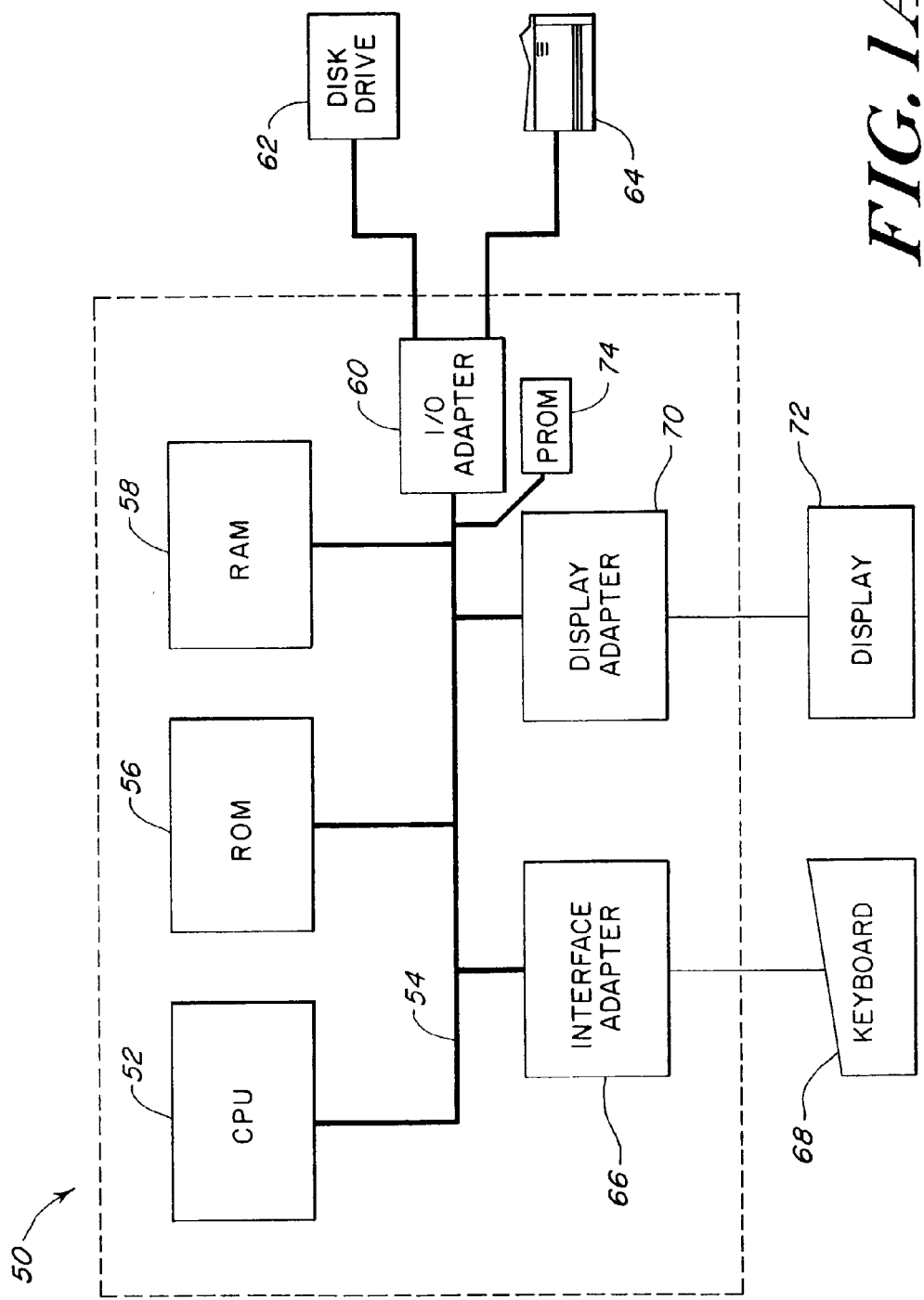
FIG. 1A is a schematic block diagram of a computer system that can generate a halftone image by use of a dither matrix in accordance with the present invention.

FIG. 1A is a schematic block diagram of a computer system 50 that can generate a halftone image by use of a dither matrix in accordance with the present invention. However, the dither matrix of the present invention may be also be used in other image rendering systems. The computer system 50 is controlled by a central processing unit (CPU) 52 such as a conventional microprocessor. The CPU 52 is connected via bus 54 to the following components: a random-access-memory (RAM) 56 for temporarily storing information; a read-only-memory (ROM) 58 for permanently storing the computer's configuration and basic operating commands; and an input/output (I/O) adapter 60 for connecting the disk drive 62, printer 64 or other peripheral devices to the bus 54. A user interface adapter 66 connects a keyboard 68 (or other types of user input devices) to the bus 54. A display adapter 70 connects the bus 54 to the display device 72. A dither matrix in accordance with the present invention is stored in a programmable read-only memory (PROM) 74 that is disposed in the computer system 50. Alternatively, the PROM 74 may form part of the printer 64 or other binary output device for generating a halftone image.

Figure 1B:
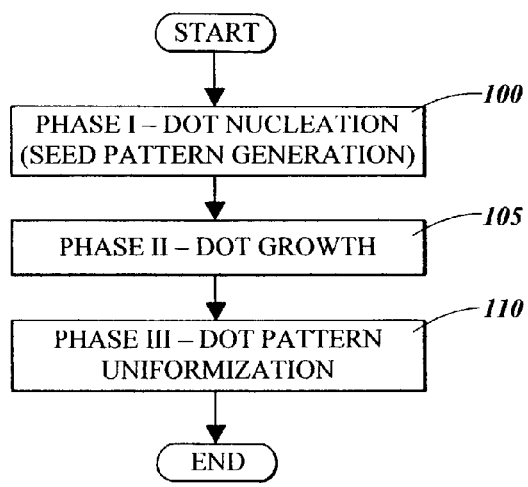
FIG. 1B is a flowchart illustrating the generation of a dither matrix in accordance with the present invention.

Referring now to FIG. 1B, there is shown an overview of a method of generating a stochastic dither matrix in accordance with a preferred embodiment of the present invention. The dither matrix is generated from individual seed patterns by use of and by programming any suitable stochastic threshold array generator. The method of generating the dither matrix includes the following steps which are described more fully hereinbelow: performing a dot nucleation (seed pattern generation) phase 100, performing a dot growth phase 105, and performing a dot pattern uniformization phase 110. The method illustrated in FIG. 1B differs from conventional blue noise dithering techniques (which typically use dot profiles). In addition, conventional approaches teach only dot number modulation for blue noise dithering.

The above steps 100, 105 and 110 each includes the use of a filter controlled force masking technique for generating the dither matrix. The filter controlled force masking technique includes the application of a force field function that determines the probability of assigning a value to a given pixel, (i.e., to turn on this given pixel). The force field function simulates the force field electrostatic charge of an "ON" pixel and is preferably a radially symmetric function. The force field function is also preferably an inverse function of distance between an "ON" pixel and an "OFF" pixel of interest, so that the function simulates the repulsive force field of the electrostatic charge of print dots. The force field value of a diagonal neighbor of an "ON" pixel is preferably less than the force field value of a horizontal neighbor of the "ON" pixel. This characteristic of the force field function causes the dot nuclei to first grow in a diagonal direction. This diagonal dot pattern is favored by the human eye because the eye has maximum sensitivity in the horizontal and vertical directions and minimum sensitivity in the diagonal directions.

One suitable repulsive force field function that may be used is shown in equation (1).

$$f=f(r)=\exp(-(r/s)^P) \quad (1)$$

The function in equation (1) is also described by Purgathofer et al. in the above-cited article entitled "Improved Threshold Matrices for Ordered Dithering," *Graphic Gems V*, pp. 297–301. The parameter f is the repulsive field, while r is the radial distance between the "ON" pixel and the "OFF" pixel to be turned on. The variables p and s are also parameters of the repulsive force field function, and are assigned values based on error and trial. For example, p may have a value ranging from about 0.4 to about 0.6, while s may have a value of about 0.5. The force field matrix value inversely corresponds to the mask value. For example, the pixel that is first turned on has the maximum force field value.

Other suitable functions with the above mentioned characteristics of equation (1) may be used to form a force field for influencing the pattern of the dither matrix.

The increment force value of each "OFF" pixel is calculated with equation (1), and is added to a force field matrix. Then the force field matrix is filtered in the frequency domain by a low pass filter wherein the low pass filter corresponds to an eye model with gray level adaptation. The low pass filter parameters controls the force distribution and thereby controls the variation of the mask patterns (from a regular structure to a random structure). Thus, the low pass filter permits the generation of a mask pattern that is favored by human eyes. The low pass filter may be a Gaussian filter that adapts to the gray level and is represented by, for example, equation (2).

$$H=\exp(-R^2/2\sigma^2)) \quad (2)$$

The parameter R is the distance from the center of the "region-of-support" (wherein the region-of-support defines the area covered by the filter when its response is about 0.1% of its normalized peak value). The parameter σ is the filter width and can be expressed by equation (3).

$$\sigma=f_g/a \quad (3)$$

The control parameter "a" is determined depending on how much dot pattern regularity is controlled. The range of parameter "a" can be from about 0.1 to about 8.0. For example, a 64×64 mask generated when a=0.1, p=0.5, and s=0.5 gives a regular dot pattern in a light tone part, while another 64×64 mask generated when a=8, p=0.5, and s=0.5 gives a very random dot pattern. The principal frequency $f_g$ is a function of the normalized tone level g, as shown in equation (4) and as described in R. Ulichney, *Digital Halftoning* pp. 234–238, MIT Press (1987).

$$f_g=g^{0.5} \text{ for } g \leq 0.5 \text{ and } f_g=(1-g)^{0.5} \text{ for } g>0.5 \quad (4)$$

The principal frequency $f_g$ is the cutoff frequency for a blue noise power spectrum, while g is the gray level normalized to one (1).

The force field f is filtered with the Gaussian Filter H in the frequency domain, as shown in equation (5).

$$F=F'H \quad (5)$$

It is further noted that in accordance with the present invention, other suitable low-pass filters may be used such as a Butterworth filter.

Figure 2:
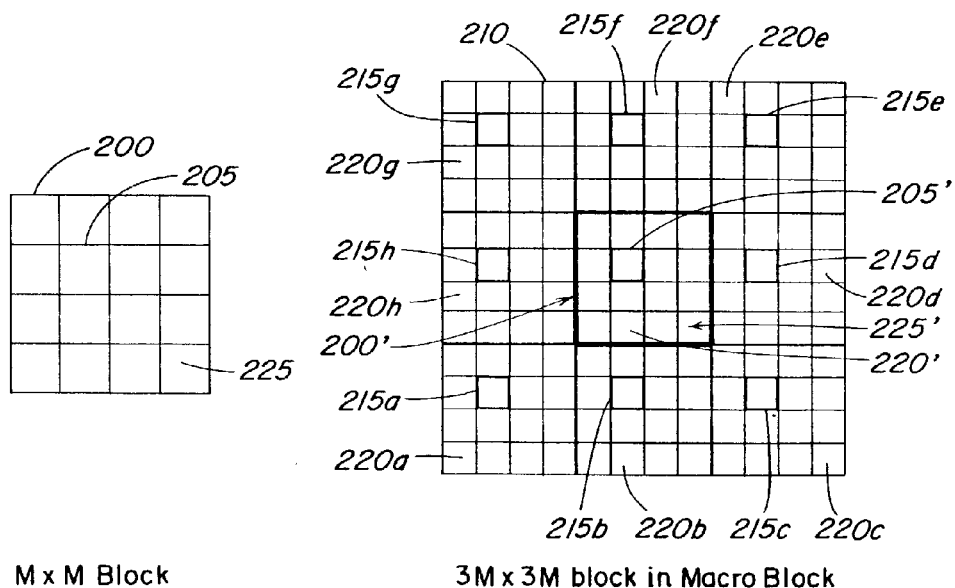
FIG. 2 is a top elevational view of pixel blocks for the purpose of illustrating the wrap-around property of a mask.

Reference is now made to FIG. 2 for the purpose of illustrating the wrap-around property of a mask. An original block 200 with M×M information is shown as having a reference pixel 205 for discussion purposes. A macro block 210 with 3M×3M information is created by copying the original block 200 while the force field f is updated (i.e., the force field is recalculated based on the "ON" pixels in macro block 210). The center block 200' in the 3M×3M macro block 210 corresponds to the original block 200. When a pixel 205' in the center block 200' is turned on, the corresponding eight (8) pixels 215a–215h with the same coordinate in eight (8) neighborhoods 220a–220h are also turned on. Among the neighbors of an "ON" pixel (e.g., pixel 205'), the force value f of a diagonal neighbor of pixel 205' is less than the force value f of a horizontal neighbor of pixel 205'. As stated above, due to this force characteristic, the dot nuclei tend to first grow in a diagonal direction.

After a pixel is turned on (e.g., pixel 205'), the eight (8) corresponding pixels 215a–215h are also turned on. The 9 pixels that are on (i.e., pixels 205' and 215a–215h) affect the force value f of other pixels in the center block 200'. The increment force values of each "OFF" pixel associated with a given one of the 9 "ON" pixels are then calculated, and the total increment force amount of each "OFF" pixel is obtained by summing those 9 individual increment force values of an "OFF" pixel. For example, to calculate the increment force value of the "OFF" pixel 225, the radial distance between the corresponding pixel 225' of "OFF" pixel 225 and one "ON" pixel 205' is calculated, and so one increment force value f is obtained with equation (1) with respect to "OFF" pixel 225' and "ON" pixel 205'. The increment force value with respect to pixel 225' and another "ON" pixel 215a, for instance, is also then calculated. The increment force values with respect to pixel 225' and each of the other "ON" pixels 215b–215h are also then obtained respectively. The total increment force field value of the "OFF" pixel 225 is obtained by summing those 9 increment force field values.

Because a pixel is set "ON" and will be left alone, only the force field values of "OFF" pixels need to be precisely calculated. For "ON" pixels (e.g., pixel 205), the increment force field value is set at a sufficiently large amount of, for example, 0.3.

Figure 3:
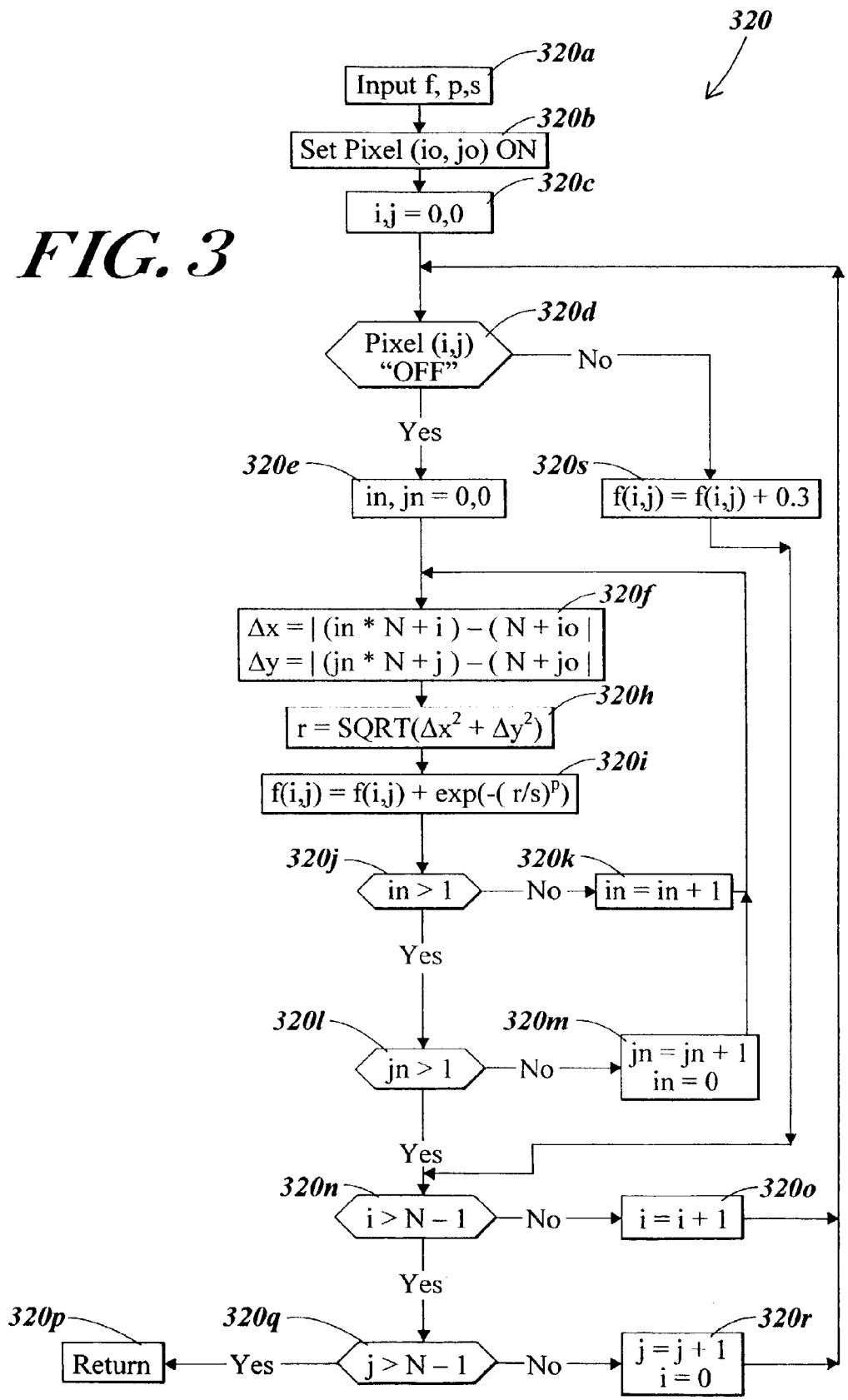

FIG. 3 illustrates a method of updating the force field matrix after a particular pixel is set "ON". The method of FIG. 3 may be used to implement step 320 in the modulation phase 100a in FIG. 4 and in the modulation phase 100b in FIG. 5. The method of FIG. 3 may also be used to implement step 510 in FIG. 8 and step 610 in FIG. 9. In step 320a, the parameters p and s of the force field function are selected and the previous force field is inputted. In step 320b, a given pixel (io,jo) (with coordinates io,jo) is set "ON" based on its force field value. The details for setting "ON" a given pixel (io,jo) is discussed with reference to step 330 in FIGS. 4 and 5, step 520 in FIG. 8, and step 620 in FIG. 9. Step 320c initializes horizontal and vertical coordinates (i,j) of pixels in the mask to zero. Test 320d determines whether the current pixel is "OFF". If the current pixel is not "OFF", the method proceeds to step 320s wherein a value of about 0.3 is added to the force field f. The method then proceeds to step 320n.

In test 320d if the current pixel is "OFF", then the method proceeds to step 320e and the neighborhood indexes (in,jn) are initialized to zero (e.g., pixel 215g in FIG. 2 is started or turned "ON"). In step 320f, the horizontal distance $\Delta x$ between the current pixel (e.g., pixel 225' in FIG. 2) and the "ON" pixel (io,jo) (e.g., pixel 205' in FIG. 2) or its corresponding "ON" pixels (e.g., pixels 215a–215h in FIG. 2) is determined as the absolute value of (in*N+i)−(N+io), assuming the mask has the size N×N. The vertical distance $\Delta y$ is the absolute value of (jn*N+j)−(N+jo). Step 320h determines the radial distance "r" as equal to $(\Delta x^2+\Delta y^2)^{0.5}$. In step 320i, the increment force field is obtained by adding the calculated equation (1) value to the previous force field f(i,j) value.

Step 320j checks whether the neighborhood column index (in) has reached 2 (wherein (in)=2 means the end of a current row in a neighborhood has been reached). If not, the method proceeds to step 320k to increment column index (in), and steps 320f to 320j are again performed. If, in step 320j, the neighborhood column index (in) has reached 2, then the method proceeds to step 320l.

If, in step 320l, the neighborhood row index (jn) has not reached 2 (wherein (jn)=2 means the last row in the neighborhood has been evaluated), then the method proceeds to step 320m wherein (jn) is incremented and (in) is reset. The method then again performs steps 320f to 320l to calculate the next increment force field value of the current "OFF" pixel (i,j). If, in step 320l, the neighborhood row index (jn) has reached 2, then the last row has been evaluated in the neighborhood, and the method proceeds to step 320n to test whether the mask matrix column index (i) has reached the end of the current row. If not, then in step 320o the column index (i) is incremented and the method proceeds to step 320d to examine next pixel (i,j). If the mask matrix column index (i) has reached the end of the current row, then the method proceeds to test 320q. At the end of a current row, test 320q determines whether the current row is the last row in the mask matrix. If not, the method increments the mask matrix row index (j) and resets (i) in step 320r and then returns to step 320d. The process is repeated until the force field values of all pixels in the matrix are updated. If the current pixel is the last one in the matrix, i.e., i=N and j=N, the method proceeds to step 320p and then returns to the main procedure in FIGS. 3, 4, 8, or 9.

After the force field matrix of the mask is updated, the force field is modified by filtering with a low pass filter, such as the gray-level adaptive Gaussian filter mentioned above. This low pass filter controls the variation of the mask pattern from a regular structure to a random structure.

As described in the overview of FIG. 1, there are three phases for mask generation: dot nucleation (seed pattern generation) phase 100, dot growth phase 105, and dot pattern uniformization phase 110. These phases are now discussed in detail, with continuing reference to the above force field equation $f=\exp(-(r/s)^p)$ and filter (Gaussian field) equation $H=\exp(-r^2/2\sigma^2)$ wherein $\sigma=f_g/a$.

Phase I—Dot Nucleation Phase (Step 100 in FIG. 1B)

During the dot nucleation phase 100, the dot size to be used depends on printability. For example, 1×1 dot size may be used for 600 dpi, while 1×3 dot size may be used for 1200 dpi. However, each dot nucleus may have its own shape, for example, shapes "/", "---", and "T", which should make the dot pattern as uniform as possible. The size of a dot nucleus is determined by the force field f.

Figure 4:
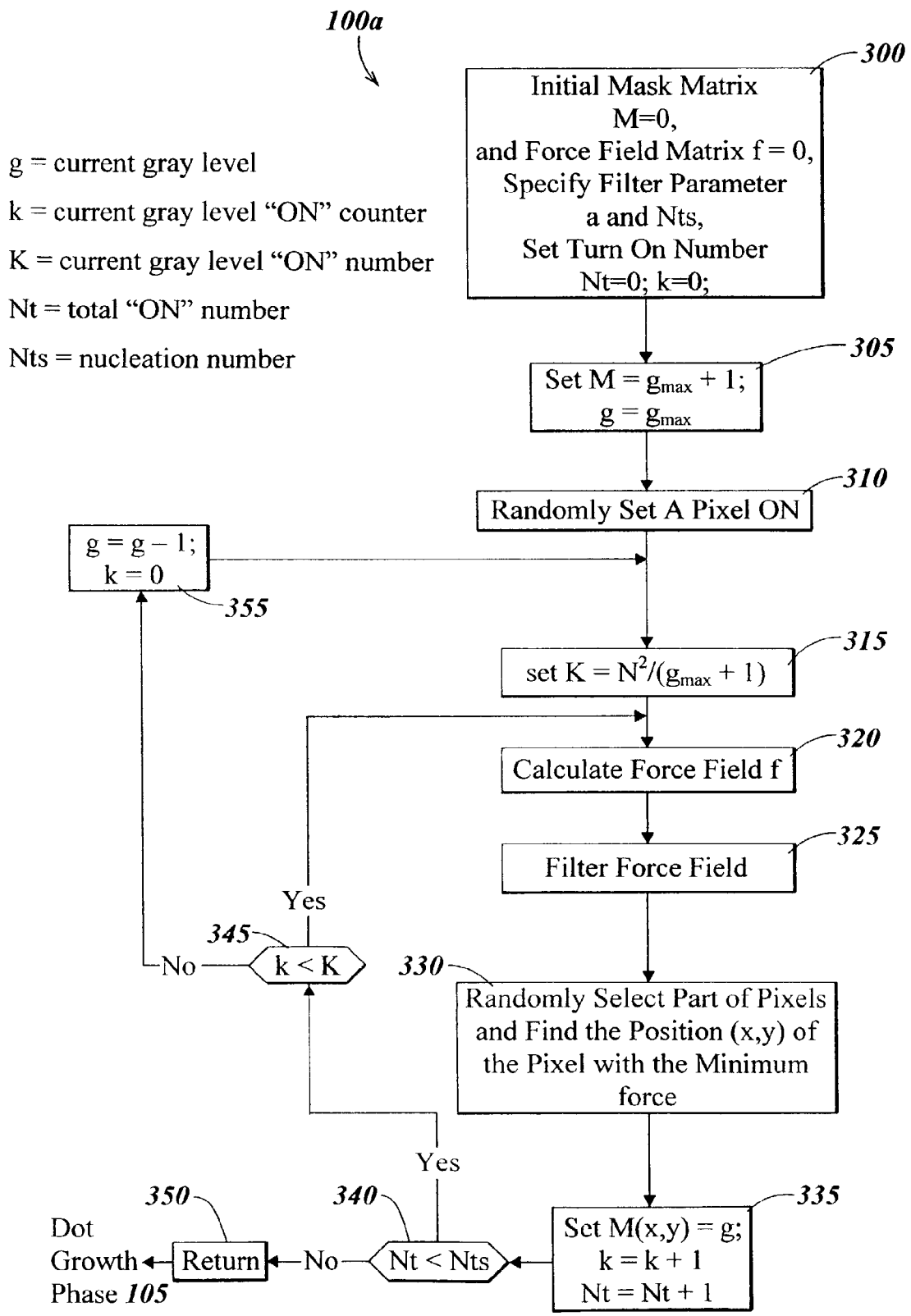
FIG. 4 is a flowchart illustrating the dot nucleation phase for a nuclei size of pixel 1×1 per dot.

FIG. 4 illustrates a flow diagram of a nucleation phase 100a for a nuclei size of pixel 1×1 per dot. The nucleation phase 100a is one embodiment of the nucleation phase 100 which is illustrated in FIG. 1B. In step 300, the dither matrix M (which is assumed as a square matrix of N by N) and the force field matrix f (also with the size N by N) are initialized. For example, M and f are set equal to zero (i.e., all pixel values in the mask matrix are set to zero). The total "ON"

number Nt (i.e., total "ON" pixels) is initialized to zero, while the current gray level "ON" counter k for indicating the current gray level is also initialized to zero.

Assuming the maximum gray level value is $g_{max}$, in step 305 the dither matrix M is set at a value greater than the maximum gray level $g_{max}$. For example, the dither matrix M is set equal to about $g_{max}+1$. The current gray level g is also set at the maximum gray level $g_{max}$. For example, in a gray scale of 0–255, the maximum gray level is 255 and $g_{max}+1$ is 256(=255+1).

In step 310, a pixel is randomly selected and assigned the value g, thereby turning the selected pixel "ON". In step 315, the current gray level "ON" number K is set as $N^2/(g_{max}+1)$, or found according to a tone transfer curve or calculated reflectance. In the following description, all K value settings are based on $N^2/(g_{max}+1)$.

As illustrated in FIG. 3, the force field calculation in step 320 updates the force field after a pixel is turned on in step 310. In step 325, the force field f is filtered with a low pass filter such as the Gaussian filter based on the equation $H=\exp(-r^2/2\sigma^2)$. The filtering process is a two-dimensional convolution, whose general discussion can be found in John, C., Russ, "The Image Processing Handbook", CRC Press, 1995, and is known to those skilled in the art. After filtering, the force distribution is changed and then the probability distribution of dot turnon is affected.

In step 330, a part (portion) is randomly selected among the "OFF" pixels. For example, one-half of the portion of the "OFF" pixels is randomly selected, and the force field values at these pixels are compared. The pixel having the minimum force field value among the randomly selected group of "OFF" pixels is identified and determined in position (x,y). In step 335, this identified pixel is set "ON", i.e., assigned the current tone level value g so that M(x,y)=g. Furthermore, the total "ON" number Nt and the current gray level "ON" counter k are both updated or incremented (i.e., Nt=Nt+1 and k=k+1) since a selected pixel has been turned on in step 330.

A parameter Nts represents the nucleation number and is set based on how many pixels can be regularly distributed in an N by N plane. For example, for a nuclei size of pixel 1×1 per dot, the nucleation number Nts can be set at about $N^2/16$. In step 340, the method determines if the total "ON" number Nt has reached the nucleation number Nts. If not, then the condition Nt<Nts is still valid and the method checks in step 345 whether the current gray level "ON" counter k has reached the current gray level "ON" number K wherein K has been previously determined in step 315. Alternatively, if in step 340 the total "ON" number Nt has reached the nucleation number Nts (i.e., Nt≧Nts), then the threshold amount of pixels has been turned on and the dot growth phase 105 is started 350.

In step 345, if the current gray level "ON" counter k is smaller than the current gray level "ON" number K (i.e., k<K), then the method repeats steps 320–340. In particular, the force field f is again calculated (step 320) and the force field is filtered with a low pass filter such as the Gaussian filter represented in equation (2) (step 325). The force field f is recalculated in step 320 because a new pixel was turned on step 335 during last loop process, and, therefore, the force field should be changed. A portion of the "OFF" pixels is again randomly selected and the force values at these randomly selected "OFF" pixels are compared (step 330). The pixel having the minimum force value among the randomly selected group of "OFF" pixels is identified and determined in position (x,y). This identified pixel (at coordinates (x,y)) is set "ON", i.e., assigned the current tone level value g so that M(x,y)=g (in step 335). Furthermore, the total "ON" number Nt and the current gray level "ON" counter k are both updated or incremented (i.e., Nt=Nt+1 and k=k+1) since another identified pixel in step 330 has been turned on in step 335.

If, in step 345, the current gray level "ON" counter k has reached the current gray level "ON" number K (i.e., k=K), then k is reset to zero and g is reduced by one (1) gray scale (i.e., g=g−1), as shown in step 355. By resetting the current gray level "ON" counter k to zero and reducing g by one gray scale, the next gray level generation is started. The steps 315 through 340 are then repeated whereby a current gray level "ON" number K is again calculated in step 315 until the total gray level number of "ON" bits corresponds to the present tone level.

Figure 5:
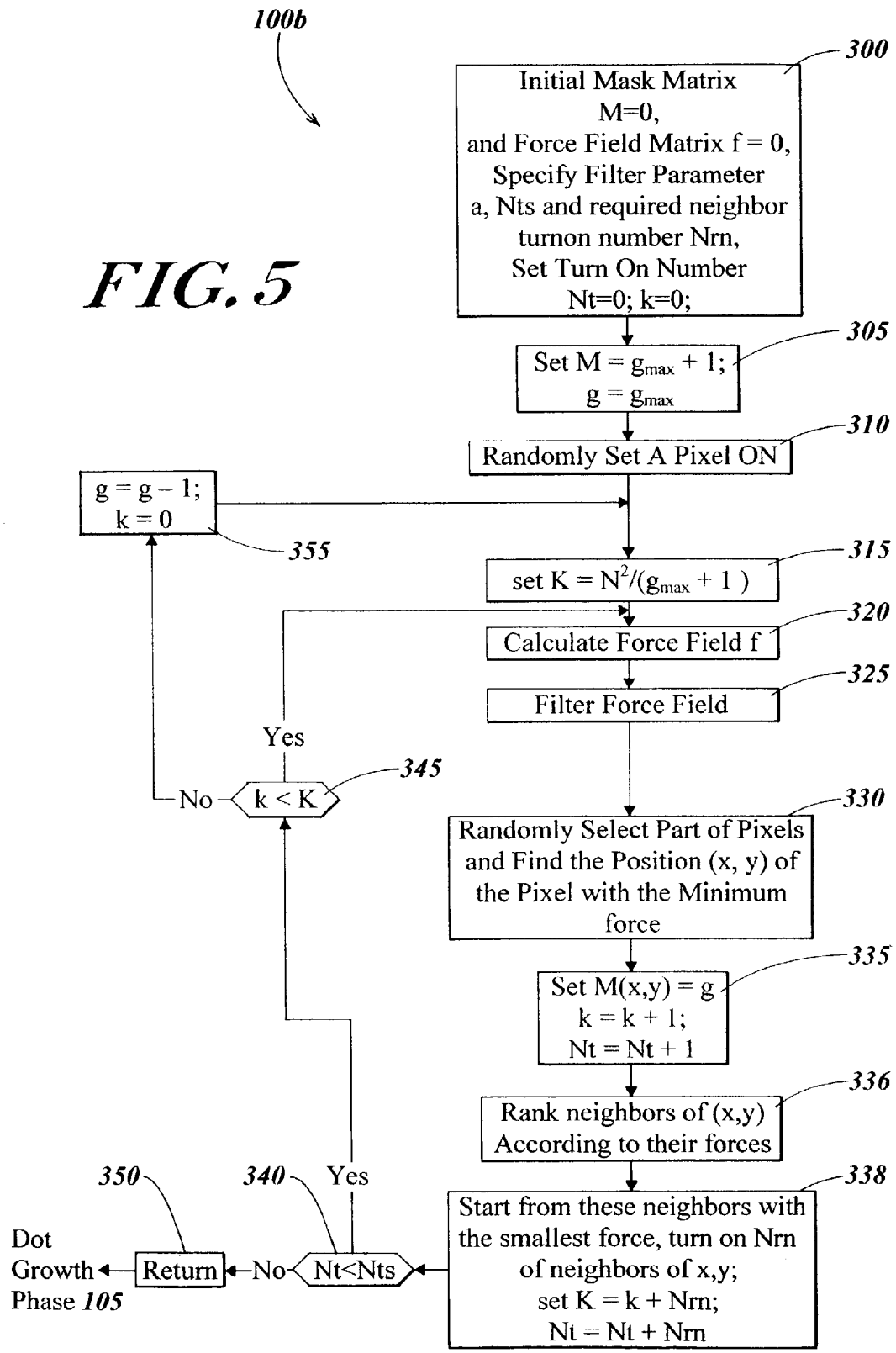
FIG. 5 is a flowchart illustrating the dot nucleation phase for a nuclei size that is larger than pixel 1×1 per dot.

FIG. 5 shows a flowchart of a nucleation phase or method 100b for a nuclei size that is larger than pixel 1×1 per dot. The nucleation phase 100b is a second embodiment of the nucleation phase 100 which is illustrated in FIG. 1B. The nucleation phase 100b in FIG. 5 includes the steps discussed with reference to FIG. 4. Additionally, in step 300, the required turnon number, Nrn, of neighbors of a current "ON" pixel (nucleus) is specified according to printability of printer. For example, for 1200 dpi laser printer, the required turnon number, Nrn, of neighbors of a current "ON" pixel can be 2, so that the dot nuclei has a size of 1×3 pixels. Moreover, nuclei growth steps 336 and 338 are performed after performing the step 335 of setting "ON" a given pixel having the minimum force value f among the randomly selected group of "OFF" pixels. In particular, after a given pixel is set "ON" in step 335, some neighbors of the "ON" pixel are also set "ON". According to step 336, the neighbors of this nucleus are ranked based on their respective force values. In step 338, an Nrn number of neighbors of this nucleus is then set "ON" based on their force value rankings. The neighbor with the smallest force value f is the first pixel to be set "ON". If Nrn=2, then another neighboring pixel with the second smallest force value in the neighborhood is also set "ON". In addition, the current gray level "ON" counter k is incremented as shown in equation (6).

$$k=k+Nrn \qquad (6)$$

Furthermore, the total "ON" number Nt is incremented as shown in equation (7).

$$Nt=Nt+Nrn \qquad (7)$$

The current gray level "ON" counter k and total "ON" number Nt are each incremented by the required turnon number of neighbors of nucleus, Nrn, because an Nrn number of neighbors have been set "ON".

FIG. 6 shows the coordinates of the 8 neighbors of a given "ON" pixel wherein nx and ny are the width and height of dither ask, respectively. In sector 400, if the given "ON" pixel has coordinate (i,j), the pixels with coordinates (i−1, j−1), (i−1,j), (i−1,j+1), (i,j−1), (i,j+1), (i+1,j−1), (i+1,j), and (i+1,j+1) are 8 neighbors that are possibly turned "ON". Sectors 405, 410, 415 and 420 illustrate the coordinates of the 8 neighbors of a given "ON" pixel when it is in the left lower corner, in the right lower corner, the right upper corner, and the left upper corner of the mask, respectively. For example, in sector 420, the pixels with coordinates (nx, ny), (nx, 1), (nx, 2), (1, ny), (1, 2), (2, ny), (2, 1), and (2, 2) are 8 neighbors that are possibly turned "ON" if the pixel (1, 1) is "ON".

As stated above, the neighbor with the minimum force is set "ON" first. Since the force field function f has an internal diagonal correlation characteristic, the seed shape is often "/" or "\" (i.e., 45° angled or diagonal).

Figure 7A:
FIG. 7(a) shows a dot pattern with regular characteristics for a nuclei size of pixel 1×1 per dot.

The seed dot pattern can have regular characteristics or blue noise characteristics depending on the filter parameters that are selected. For example, to obtain a seed dot pattern with regular characteristics, the following filter parameter values are chosen: a=1, p=0.6 and s=0.5. The dot pattern 450 with regular characteristics is illustrated in FIG. 7(*a*), which was obtained at gray level=240. To obtain a seed dot pattern with blue noise characteristics, the following filter parameter values are chosen: a=3, p=0.5 and s=0.5. The dot pattern 455 with blue noise characteristics is illustrated in FIG. 7(*b*), which was obtained at gray level=240.

In FIG. 7(*c*), a seed pattern 460 and its Radially Averaged Power Spectrum (RAPS) 465 are shown. In the graph of RASP 465, the power spectrum in the low frequency part is cut off and the power spectrum in the higher frequency (i.e., blue noise spectrum) is shown. The RAPS of seed patterns is further described in R. Ulichney, *Digital Halftoning*. FIG. 7(*c*) shows the generated seed pattern 460 to have a very good blue noise attribute. Since the single dots in seed pattern 460 are sparsely and randomly distributed, for color halftoning, there is no rosette structure, and so the registration requirement can be relaxed. The dots in seed pattern 460 are smaller than clustered macrodots such that the image resolution is higher.

Phase II—Dot Growth Phase (Step 105 in FIG. 1B)

When the macrodots (for dot size larger than 1×1 pixel) or the single dots (for dot size of 1×1 pixel) tend to touch together, the dot growth phase 105 (FIG. 1B) is triggered. As mentioned above, in particular, the dot growth phase 105 is triggered when the nuclei number Nts (step 340 in FIG. 4) of a single dot increases to about 1/16 of the total pixel number. Similarly, the dot growth phase 105 is triggered when the nuclei number Nts of macrodots preferably increases to about 1/32 of the total pixel number in the dither matrix. The above numbers for triggering dot growth may be changed for different printers.

Eight (8) possible "OFF" neighbors of a single "ON" dot are considered for potential dot growth places. Reference is again made to FIG. 6 to show which neighborhood is chosen for dot growth. A dot growth position should have the minimum force field value among those neighbors.

Figure 8:
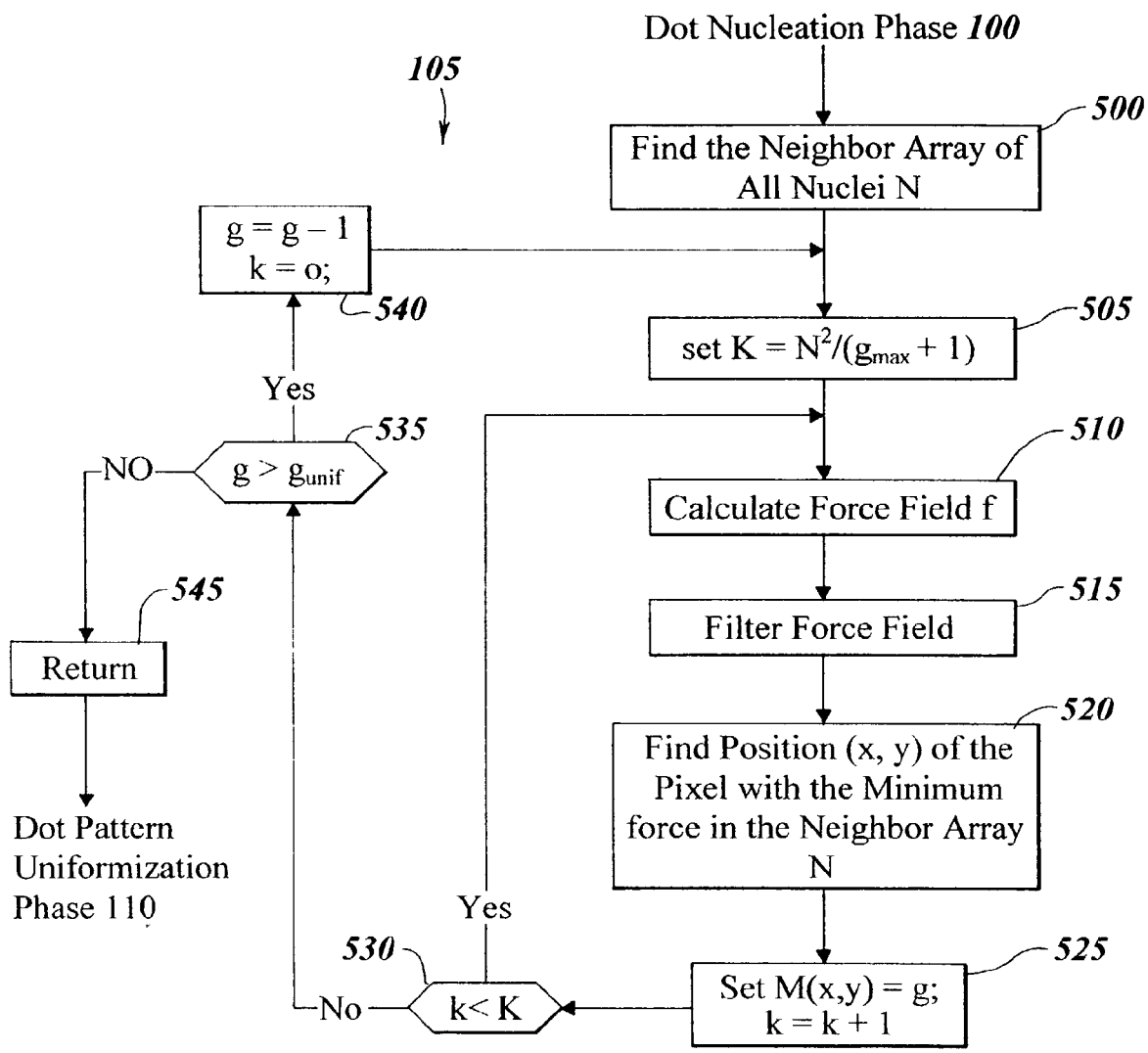
FIG. 8 is a flowchart illustrating the dot growth phase which occur after the dot nucleation phase.

Referring now to FIG. 8, there is shown a flowchart that illustrates a method for performing dot growth after completion of the dot nucleation phase 100. In step 500, the neighbor "OFF" array of all nuclei N are identified according to FIG. 6. This neighbor array includes all "OFF" pixels in 8 neighbors of all "ON" pixels, but one "OFF" pixel only appears once as an element of the array. In step 505, the current gray level "ON" number K is set to, for example, $N^2/(g_{max}+1)$. The force field f is updated in step 510 (see FIG. 3) and filtered by a low pass filter in step 515.

The pixel M(x,y) with the minimum force value among the neighbor array N is identified in step 520 and set "ON" (i.e., M(x,y)=g) in step 525. The current gray level "ON" counter k is also updated (incremented) in step 525 since the pixel M(x,y) has been set "ON". In step 530, the value of the current gray level "ON" counter k is compared to the value of the current gray level "ON" number K. If the current gray level "ON" counter k is less than the current gray level "ON" number K, then steps 510–525 are repeated until all available "ON" pixels correspond to the tone in the current gray level. If, in step 530, the current gray level "ON" counter k reaches the current gray level "ON" number K, then the method proceeds to step 535.

In step 535, it is determined whether the current gray level g has reached the uniformization gray level flag $g_{unif}$, wherein the uniformization gray level flag $g_{unif}$ represents the flag to trigger the uniformization phase 110. The uniformization gray level flag $g_{unif}$ is determined by error and trial and is set so that the macrodots do not grow too large in size. As an example, starting from single dot nucleation for 600 dpi printing, the value of $g_{unif}$ can be 160 while the gray level range is 0–255. If, in step 535, the current gray level g has not reached the uniformization gray level flag $g_{unif}$ (i.e., $g>g_{unif}$ is still valid), then the method proceeds to step 540 whereby k is reset to zero, g is reduce by one (1), and next gray level generation is started (steps 505–530). Steps 505–530 are repeated until all gray levels above $g_{unif}$ have been included in the mask matrix.

If, in step 535, the current gray level g has reached $g_{unif}$, then the method proceeds to step 545 so that the dot pattern uniformization phase 110 is started.

Phase III—Dot Pattern Uniformization Phase (Step 110 in FIG. 1B)

Figure 9:
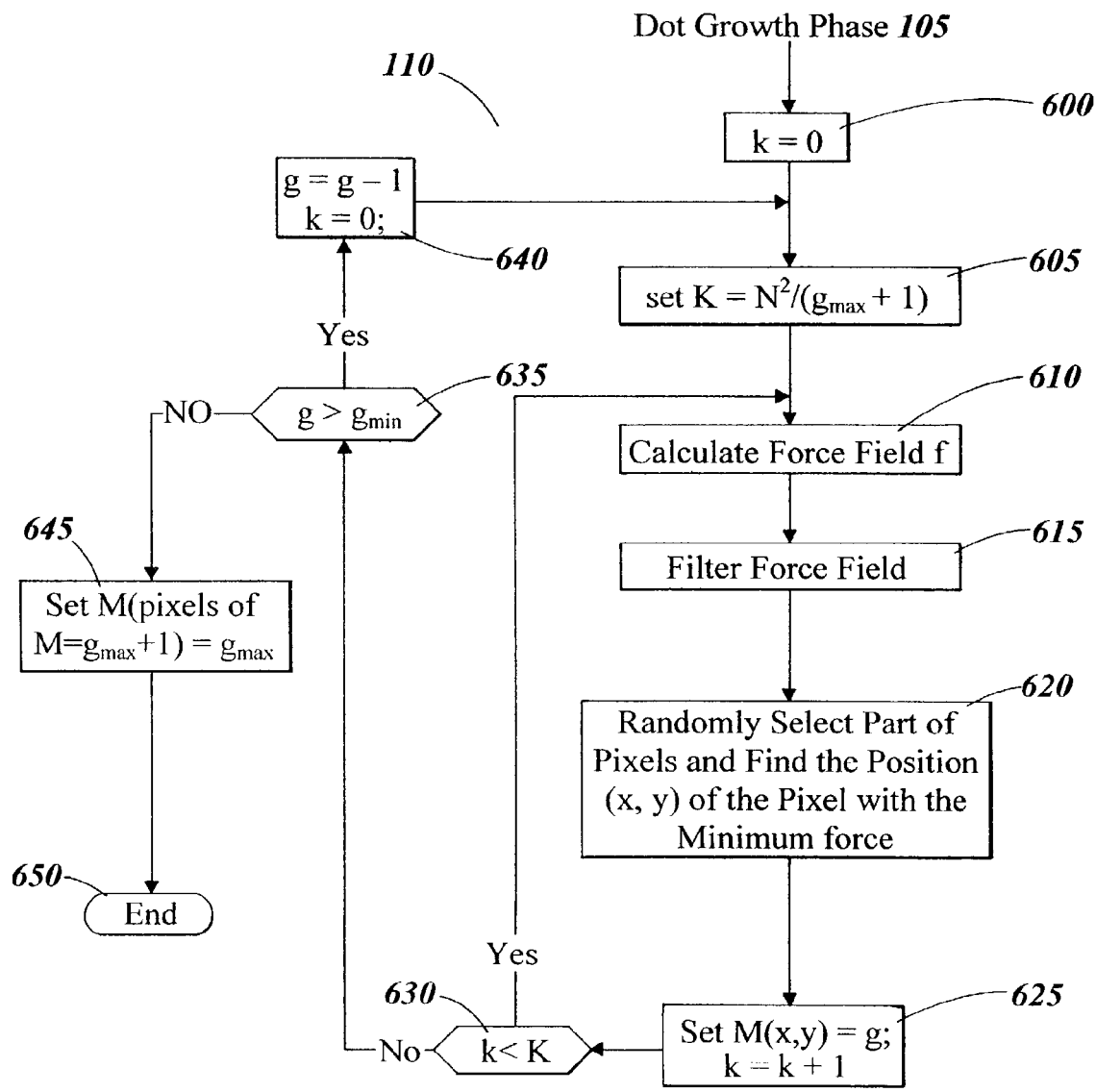
FIG. 9 is a flowchart illustrating the dot pattern uniformization phase which occur after the dot growth phase.

After the dot size grows to a certain size, the second nucleation phase 110 is initiated to make the dot pattern uniform. The single pixels are to be turned on to produce a high end level image with high resolution. Referring now to FIG. 9, there is shown a flowchart of a second nucleation phase 110 for achieving dot pattern uniformization. In step 600, the current gray level "ON" counter k is initiated to k=0. In step 605, the current gray level "ON" number K is determined according to $N^2/(g_{max}+1)$ or according to another suitable tone transfer curve (or calculated reflectance).

After the current gray level "ON" number K is determined, the force field f is calculated in step 610 and filtered by a low pass filter in step 615. In step 620, a portion of the "OFF" pixels is randomly selected, and the force field values at these pixels are compared. In step 625, the pixel having the minimum force value among these randomly selected "OFF" pixels is set "ON" (i.e., assigned the current tone level value g) so that M(x,y)=g. The current gray level "ON" counter k is also incremented since the selected pixel is turned on in step 625.

In step 630, the current gray level "ON" counter k is compared with the current gray level "ON" number K. If k is smaller than K, then steps 610–630 are again performed whereby the force field f is again calculated (step 610 in FIG. 5) and k is again incremented (step 625). The cycle 610–630 is again performed until the total gray level number of "ON" bits corresponds to the present tone level. If, in step 630, the current gray level "ON" counter k has reached K, then the method proceeds to step 635 whereby the current gray level g is compared with the minimum gray level value $g_{min}$. The value of the minimum gray level value $g_{min}$ is set based upon printability, and generally it is zero (0) in value.

If, in step 635, the current gray level g has not reached the minimum gray level value $g_{min}$ (i.e., $g>g_{min}$), then the method proceeds to step 640 whereby k is reset to zero, and g is reduced by one (1) gray scale to start next gray level generation. The method then repeats steps 605–630 until all of available gray levels (e.g., 256 levels) have been included in the mask matrix.

If, in step 635, the current gray level g has reached the minimum gray level value $g_{min}$, then the method proceeds to step 645 whereby the pixels with the matrix M values of $g_{max}+1$ are set as $g_{min}$. Step 645 sets all left "OFF" pixels "ON" and assigns the lightest tone level value to these pixels. The mask generation is thus finished in step 650.

Figure 7B:
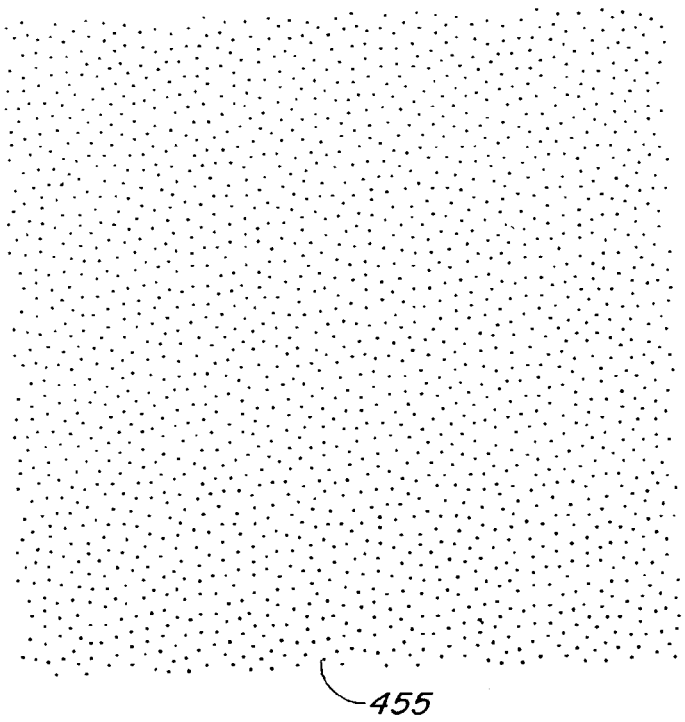
FIG. 7(b) shows a dot pattern with blue noise characteristics for a nuclei size of pixel 1×1 per dot.
Figure 7C:
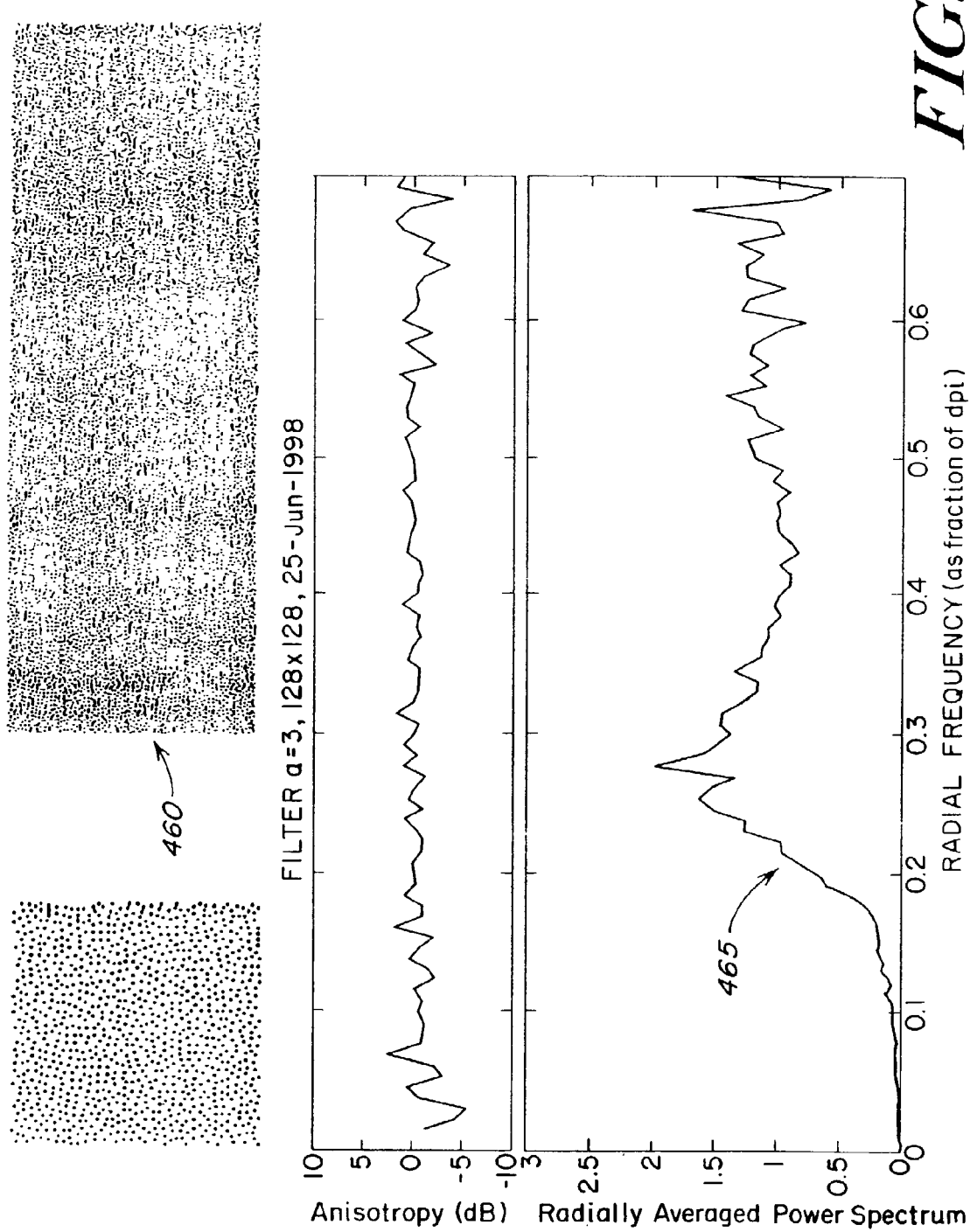
FIG. 7(c) shows diagrams illustrating a seed pattern with blue noise characteristics and a graph of a Radially Average Power Spectrum.
Figure 10A:
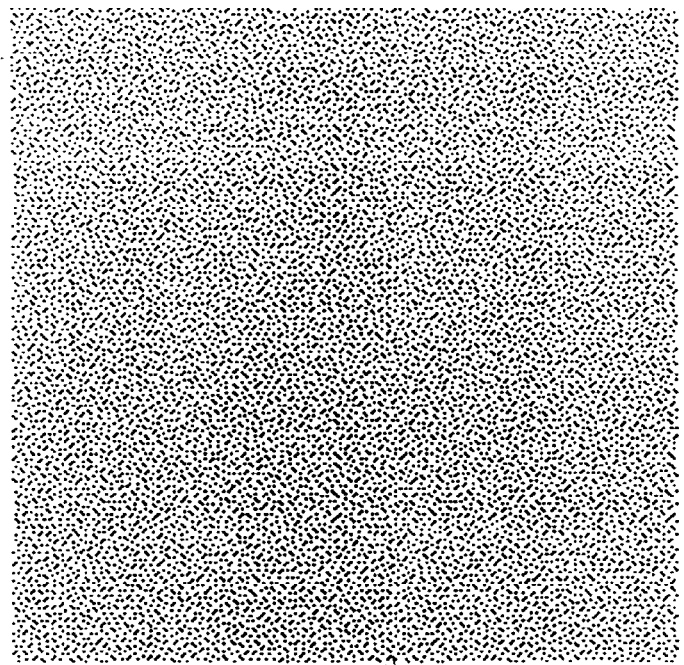
FIG. 10(a) shows a dot pattern during the dot growth phase for a nuclei size of pixel 1×1 per dot.
Figure 10B:
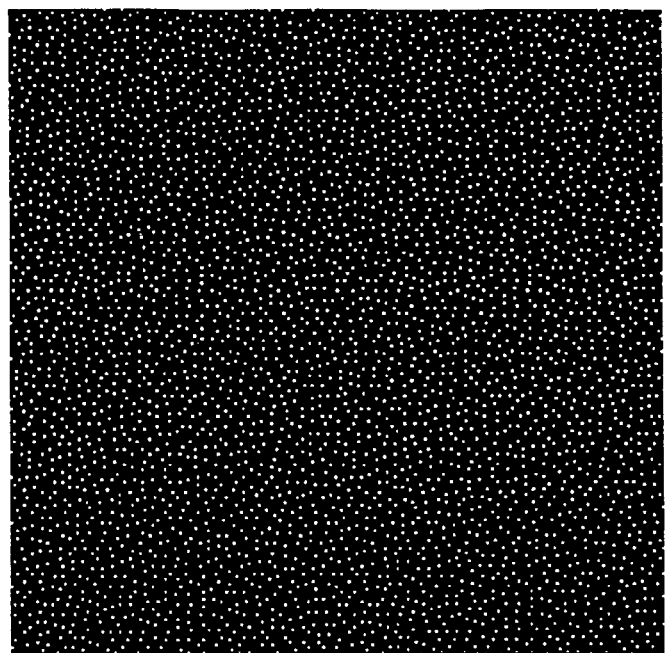
FIG. 10(b) shows a dot pattern during the dot pattern uniformization phase for a nuclei size of pixel 1×1 per dot.
Figure 11A:
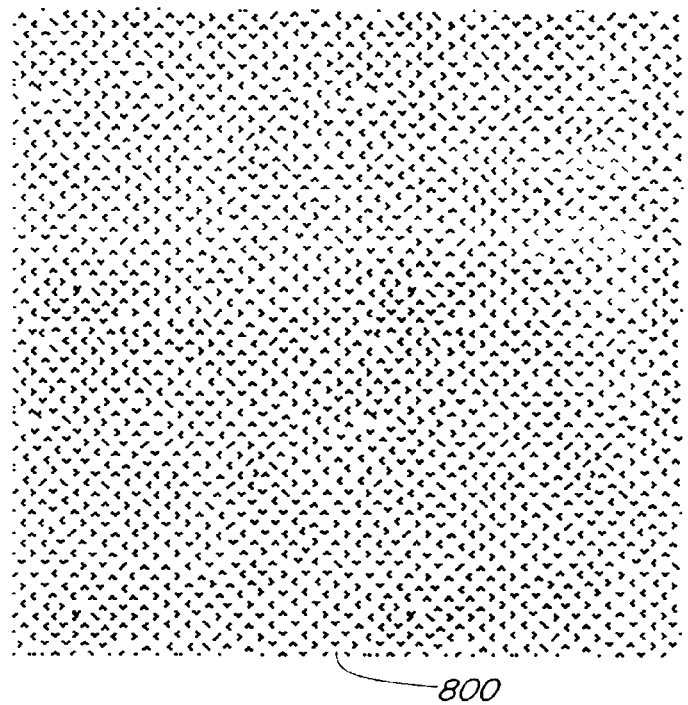
FIG. 11(a) shows a dot pattern during the start of the dot nucleation phase for a nuclei size of pixel 1×3 per dot.
Figure 11B:
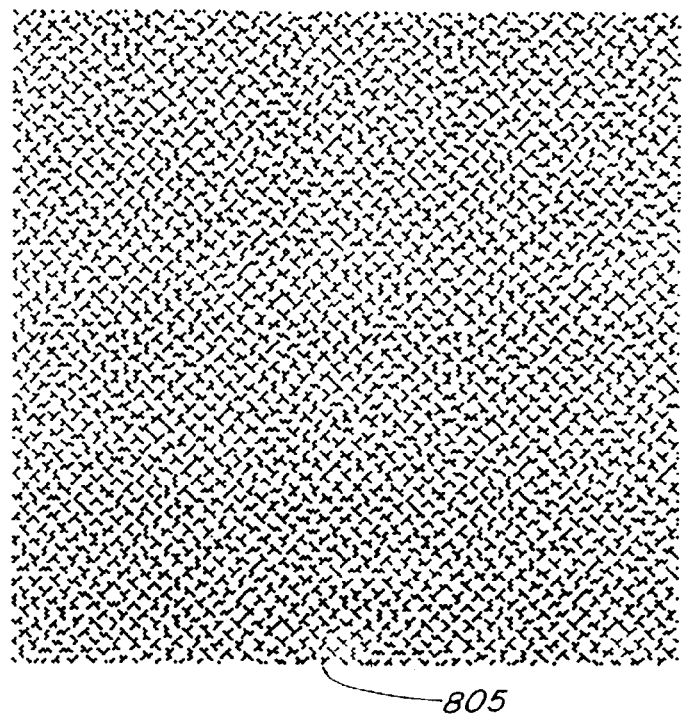
FIG. 11(b) shows the dot pattern of FIG. 11(a) during the dot growth phase for a nuclei size of pixel 1×3 per dot.
Figure 11C:
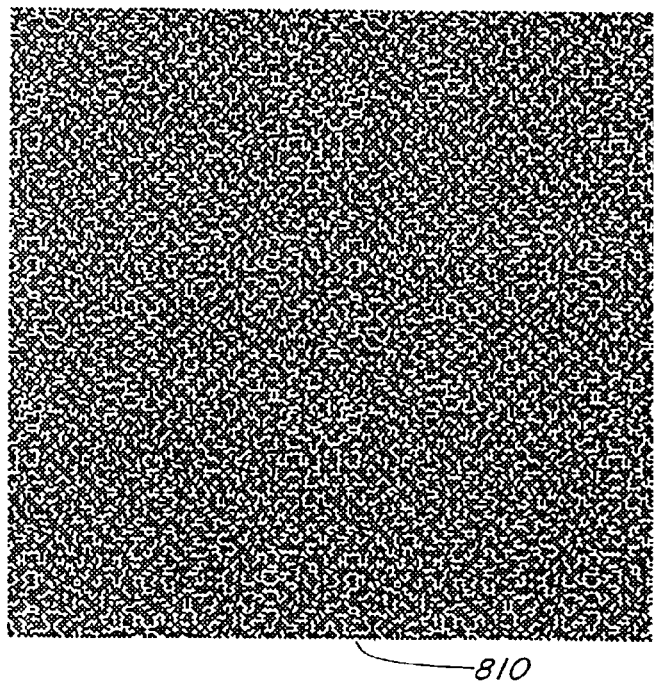
FIG. 11(c) shows the dot pattern of FIG. 11(b) after the dot growth phase for a nuclei size of pixel 1×3 per dot.

FIGS. 7(b), 10(a), 10(b) and 11(a) to 11(d) show how the dot patterns sequentially change from the dot nucleation phase to the dot growth phase, and from the dot growth phase to the dot pattern uniformization phase and to the finished mask. All dot patterns were obtained at a=3, p=0.5, and s=0.5. FIGS. 7(b), 10(a), and 10(b) illustrate a mask generation starting from nucleus with single dot (for 600 dpi printing), while FIGS. 11(a) to 11(c) are to illustrate a mask generation starting from nucleus with 1×3 pixels per dot (for 1200 dpi printing).

FIG. 7(b) shows a dot pattern 455 at gray level=240 during the dot nucleation phase 100, and so all dots are single dots. FIG. 10(a) shows a dot pattern 700 at gray level=208 during the dot growth phase 105, and so some dots are 1×2 pixels per dot, and some are 1×3 pixels per dot. FIG. 10(a) also shows that those macrodots have the shapes "/" or "\" (i.e. 45° angled or diagonal). FIG. 10(b) shows a dot pattern 705 at gray level=15 during the dot uniformization phase 110. After some uniformization steps, "OFF" dots (white dots) are each of a single pixel and suitable for interpreting images in a shadow area with high resolution.

Figure 11D:
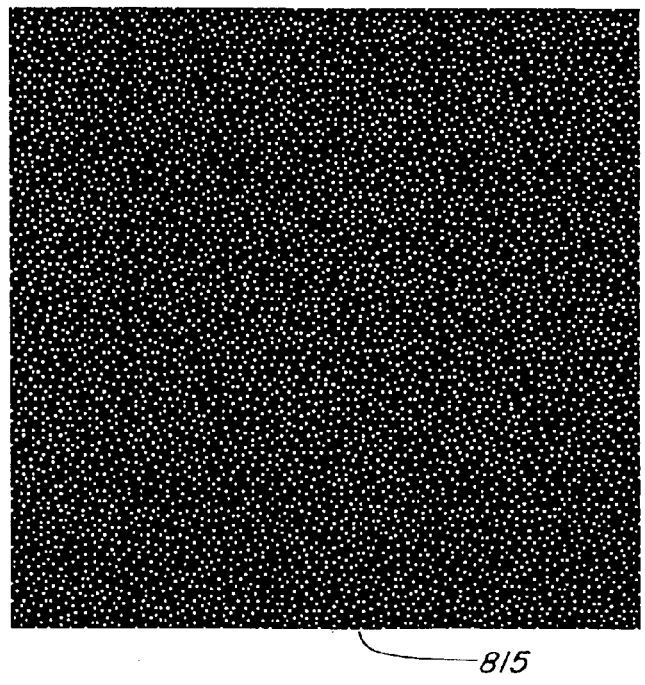
FIG. 11(d) shows the dot pattern of FIG. 11(c) during the dot pattern uniformization phase for a nuclei size of pixel 1×3 per dot.

FIG. 11(a) shows a dot seed pattern 800 at gray level=232 during the dot nucleation phase 100, and so all dots are 1×3 pixels per dot with shapes "/", "\", or "v". FIG. 11(b) shows a dot pattern 805 at gray level=200 during the dot growth phase 105. Macrodots have different sizes (larger than 5 pixels per dot). FIG. 11(c) shows a dot pattern 810 at gray level=50 during the dot uniformization phase 110, where some smaller dots (for example, 1×3 pixels per dot) make the pattern more uniform and are more suitable for interpreting image details in a shadow area. FIG. 11(d) shows a dot pattern 815 at gray level=2 in the end of uniformization phase. Again, "OFF" dots (white dots) are single dots (1×1 pixel).

FIG. 12 shows various images (600 dpi) that are generated by use of the dither matrix in accordance with the present invention. FIG. 13 shows various images (1200 dpi) that are generated by use of the dither matrix in accordance with the invention.

From the above description, it will be apparent that the invention disclosed herein provides a novel and advantageous stochastic screening method that generates halftone patterns with a visually pleasing blue noise attributes. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of rendering a halftone image from a source image using a pixel by pixel comparison of the source image against a variable pattern comprising the steps of:
    (a) generating a variable pattern by modulation of the dot number and dot size based on source image characteristics;
    (b) comparing the source image against the variable pattern; and
    (c) printing a dot pattern on a recording medium based upon the step (b) of comparing the image against the variable pattern.

2. A computer-readable medium containing a program for causing an image rendering system to perform the steps of:
    (a) generating a variable pattern based on image characteristics of a source image by modulation of the dot number and dot size;
    (b) comparing the source image against the variable pattern; and
    (c) printing a dot pattern on a recording medium based upon the step (b) of comparing the source image against the variable pattern.

3. A method of rendering a halftone image from a source image using a variable pattern, the method comprising the steps of:
    modulating the dot number and the dot size in a dot pattern based on image characteristics of the source image to form a variable pattern;
    comparing the variable pattern against the source image using a pixel-by-pixel comparison; and
    rendering the halftone image using the variable pattern, wherein the variable pattern includes dot number and dot size modulation information.

4. A variable pattern produced by the method of claim 3, wherein the variable pattern comprises a dither matrix.

* * * * *